July 28, 1953     H. B. ACKERMAN     2,646,733
RECORD-ACTUATED PHOTOCOMPOSING MACHINE
Filed Dec. 20, 1947     3 Sheets-Sheet 1

INVENTOR
Howard B. Ackerman
BY
Pennie, Edmonds, Morton and Barrows
ATTORNEYS

INVENTOR
Howard B. Ackerman
BY Pennie, Edmonds,
Minton and Barrows
ATTORNEYS

FIG. 5

INVENTOR
Howard B. Ackerman
BY
ATTORNEYS

Patented July 28, 1953

2,646,733

UNITED STATES PATENT OFFICE 2,646,733

RECORD-ACTUATED PHOTOCOMPOSING MACHINE

Howard B. Ackerman, Rockville Centre, N. Y.

Application December 20, 1947, Serial No. 792,977

11 Claims. (Cl. 95—4.5)

My invention relates to improvements in apparatus for photographically composing justified lines of text matter for use in making plates for offset presses, letter presses, photo-lithographic and other types of presses or printing.

More particularly the apparatus or machine of my present invention is adapted to be operated automatically by a record strip containing code signals of text matter and controls such as that produced by the machine described and claimed in my pending application Serial No. 773,690, filed September 12, 1947, for "Justifying Compositor." The machine of the present invention may use record strips which vary somewhat from that disclosed in that application.

While a number of different machines of the type in question have been proposed, it is not known that any have obtained a useful or commercial status. Patents have also been granted on photo-composing machines, as for example, U. S. Patent Nos. 2,229,689; 2,229,690; 2,298,666 and 2,388,961.

Some of the difficulties with previously proposed machines include high cost of manufacture, complex mechanical arrangements and inability to justify and to determine character widths accurately. The patents listed above describe the general purposes and features of photo-composing machines of the type under consideration, and the latest patent alleges certain disadvantages with respect to machines previously suggested.

A number of problems are involved in the manufacture and use of machines of this type. One is the provision of satisfactory automatic means for translating the justification signal from a record strip and measuring it off accurately during the photo-composing operation. Another problem is that of providing mechanism which is sufficiently fast, flexible and accurate, for determining and measuring of the space values of the characters, punctuations and other matter used as text. In order for a machine to be satisfactory, it must give results approximating that obtained by skilled type setters.

The primary feature of the present invention is to provide an automatic photo-composing machine which may be operated by a record strip, which is fast and accurate, and which can be manufactured at a cost permitting commercial use of the apparatus.

Accordingly, my improved apparatus comprises an electrically operated completely automatic combination of mechanisms including a movable carrier or table for holding a sensitized sheet upon which the elements for typographical composition are photographically projected, mechanism for moving the carrier sidewise the exact space for each character or element of composition in response to signals received from a record strip carried through and handled by the apparatus, separate automatic mechanism for moving said carrier sidewise in response to a space signal, mechanism responsive to a space length representation on the tape for setting the width of the spaces, and photographic mechanism including a character plate for projecting images of elements of typographical composition onto the light sensitive sheet upon the sheet carrier or table.

An important feature of the invention comprises an electronic mechanism for determining from the justified space length signal on the record tape the adjustment for the spacing mechanism in actuating the carrier for the sensitized sheet. The space control mechanism includes means for utilizing a light source for taking the space measurement from the record tape.

The apparatus includes electrical pick-up mechanism for the signals of the elements of typographical composition carried by the record tape and for in turn initiating the actuation of the various elements of the apparatus referred to, including the selection of the typographical element to be photographed, the operation of the camera, and the positioning of the carrier for the sensitized sheet onto which the elements of typographical composition are projected.

The apparatus of my invention is adapted to handle the record tape and produce the photographic composition at a very rapid rate. It has the advantages that it may be used for various types of printing by which photographs of the composition may be used in well-known ways in the types of printing referred to above. Since no type need be handled or used, the photographs or plates made therefrom will be very convenient to handle and store. In fact the complete photographic record for a book, as an example, may be kept in an extremely small storage space, as compared to the weight and space involved in keeping conventional type plates for such a book.

My improved machine includes other features and advantages which will be described more in detail hereinafter in connection with the accompanying drawings which form a part of this application.

In an apparatus of this type, it will be understood that variations may be made in the detailed structure. In general, however, the apparatus as referred to above, and illustratively shown in the drawings, comprises mechanism for producing a photographic composition from a previously prepared record strip containing signals representing the various elements of the composition, the spaces, and spaced width and other controls. The apparatus is completely automatic and electrically operated by a relatively simple electrical arrangement including the circuit, conventional types of relays and operating mechanisms. While all of the operating mechanisms operate in correlation and synchronization with respect to each other, most of the apparatus elements of each may be conveniently described separately and then in connection with an illustrative example.

*Record strip handling mechanism*

Figures 1, 4:
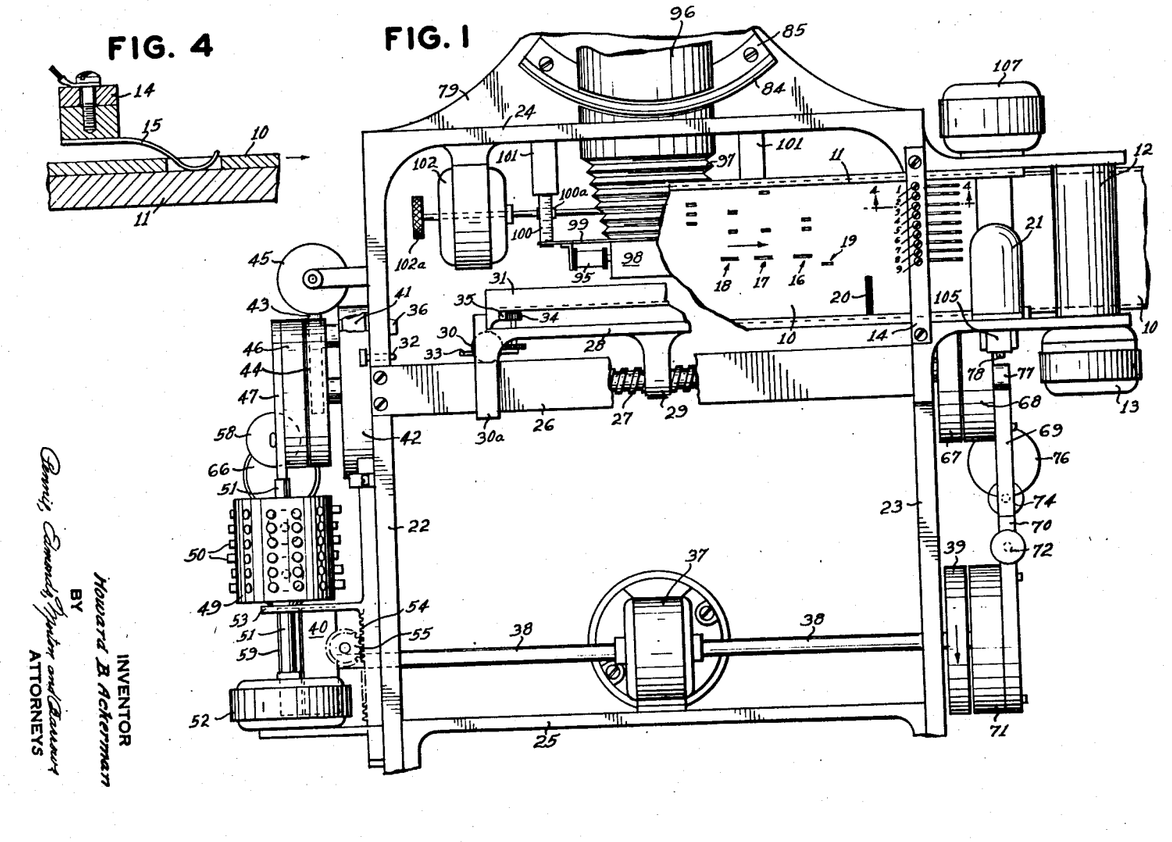
Fig. 1 is a broken front elevational view of a portion of a photographic composing machine constructed in accordance with my invention, in which many of the elements of the apparatus are shown diagrammatically.
Fig. 4 is an enlarged detailed view taken on the line 4—4 of Fig. 1 illustrating one of the signal pick-up elements which operates on the record strip.

Referring to Fig. 1 of the drawings, a previously prepared record strip 10 containing character, space and other signals is moved through an open-faced slideway 11 having a metal back. The strip has the usual marginal slots or holes by which its movement is effected by a roller 12 which is driven by a motor 13. A bar 14 of insulating material mounted on the face of the frame of the apparatus carries a vertical series of signal pick-up contacts or units numbered 1 to 9 from top to bottom. As shown in Fig. 4, each of these units includes a screw connecting a lead wire to a metal spring 15 carried by a metal block as shown. The spring 15 rides on the record strip 10 and enters the signal perforation therein to engage the grounded metal back of the slideway 11 to complete an electrical circuit.

The record strip 10 as illustrated and as used, advantageously comprises a transparent cellulose film or strip, and as illustrated is perforated in the upper portion for character signals. For example, the vertical row of perforations 16 represents the signal for "A," 4 and 5, the row 17 the signal for "N," 1 and 5, and the row 18, the signal for "D," 3 and 5. The signal for each character also includes a longer slot operating the signal contact 8. The next signal to the left on "D" in Fig. 1 is for "space," 2, 3 and 4. The signal 19 is a justification signal and the length of the black line 20 to the right represents the justified space measurement for the line of typographical representations following successively to the left beginning with "A."

The record strip 10 moves to the right in Fig. 1 so that for any given line of composition to be photographed the first signals to be acted upon are the black space length line 20 and the justification signal 19. The signal perforation 19 permits the activation of the contact 9, while the black line 20 is carried by the tape through a justified space-control mechanism including a pair of electronic light sensitive tubes 21, one of which is shown in front of the record tape in Fig. 1. This control apparatus is shown completely in Fig. 5 and will be described in detail hereinafter.

*Character-measuring or positioning mechanism*

The frame of the apparatus as shown in Fig. 1 includes a pair of spaced side panels 22 and 23 connected by a cross-frame panel 24 at the top, a bar or panel 25 at the bottom and a side bar 26 at an intermediate position. The latter bar is mounted in front of a worm 27 which is carried by and rotatably mounted in the end panels 22 and 23. A table or carrier 28 for the sensitized sheet is supported on and actuated by the worm 27 by a threaded yoke 29 which is threaded onto the worm. The table 28 is also supported by a roller 30 which rolls on the horizontal cross-bar 26. The table may be otherwise supported by one or more additional rollers, not shown, which bear on a cross-bar similar to the bar 26. A guide 30a on the table 28 also engages the bar 26.

The table 28 is moved sidewise under the camera by rotation of the worm 27 and the table carries a paperholder 31 which is movable forward as the composing operation proceeds. The arrangement is adapted for the production of a positive photograph, since, as the typographical elements are impressed upon the sensitized sheet in a given line, the table 28 moves to the right. When the line is finished the table 28 is retracted for the photographing of the next line, and therefore brought back to a point adjacent the side frame member 22 where an adjustable pin 32 engages a ratchet pin 33 to actuate a pinion 34 carried by the table and a rack 35 on the underside of the holder 31, to move the paper-holder forward one line. The table is brought to a predetermined stop position by a stop 36 on the panel frame 22. The member 32 is advantageously adjustable so as to control the stroke of the ratchet and thereby the line spacing with the composition. Stop 36 is also adjustable.

The worm 27 is actuated to move the table 28 to the right step-by-step, according to the width of the typographical elements of the composition by an electromagnetically operated stepping mechanism mounted on the outside of the panel 22. A similar type of movement for the justified space width of the composition is effected by a somewhat similar mechanism mounted on the outside of the panel 23, it being understood of course that the worm 27 is retained in fixed endwise position so that the table 28 is moved by the threaded yoke on the worm. Both of the worm actuating mechanisms have electromagnetic clutch elements operated by a motor 37 attached to the frame and arranged to drive a horizontal shaft 38 which at its right end has an attached clutch disc 39, and at its left end a similar attached clutch disc 40.

The means for rotating the worm 27 to retract the table 28 to its stop position includes a conventional clock spring 41 attached to the extending left end of the worm shaft and mounted in a casing 42 attached to the outside of the panel 22. When the worm is driven in a direction to move the table 28 to the right, the clock spring is wound up so that when the worm is released the clock spring spins the worm to move the table to the left. Normally the worm is held against rotation by action of the clock spring, by a spring-operated brake lever 43 which bears on a brake drum 44 fixed to the worm shaft. The brake is released by an electromagnet 45 when a line is completed and the table 28 is to be retracted.

Figure 3:
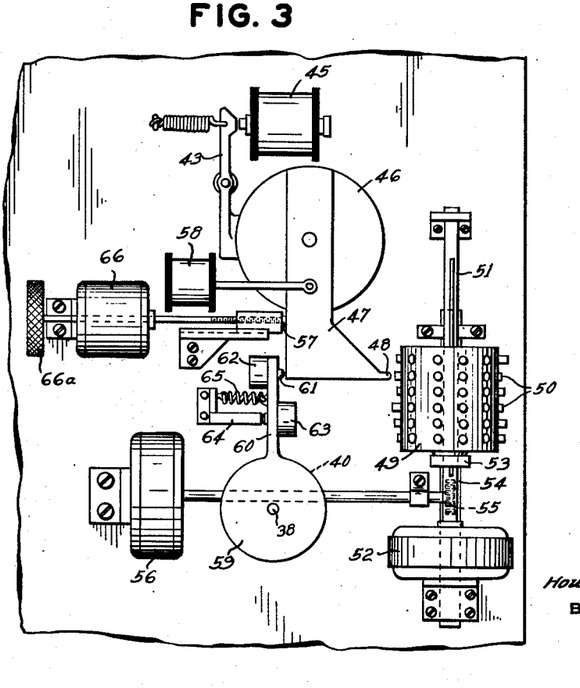
Fig. 3 is a partial end elevational view taken from the left of the apparatus shown in Fig. 1 and more particularly illustrating the mechanism for measuring the width of the typographical elements and for actuating the carrier for the sensitized sheet.

Some of these elements are more completely shown in Fig. 3 of the drawings in connection with other mechanism associated with the operation of the worm 27.

The brake drum 44 which is attached to the worm shaft serves as a clutch disc of a magnet clutch associated with the shaft and which includes a clutch means 46, which when rotated by an attached arm 47 rotates the drum 44 against the action of the brake arm 43 and the spring 41, to rotate the worm 27 to in turn move the table 28 step-by-step. The lever 47 is provided with an anvil-like head having a tip 48 which is made use of in connection with the opposite edge of the lever for measuring the distance which the table 28 is moved in one step, a distance which corresponds to the particular character or typographical element impressed upon the sensitized sheet. The tip 48 of the lever is arranged to engage a character pin on a character cylinder 49, carrying vertical and horizontal rows of character pins 50.

When the signal for a particular typographical element energizes the apparatus, the pin cylinder 49 is actuated to present the proper pin 50 opposite the tip 48. The pin cylinder 49 is mounted axially on and keyed to a shaft 51 for vertical movement thereon and rotation therewith. The shaft 51 is driven by a motor 52 which is a positioning motor adapted to position the proper vertical row of pins opposite the lever tip 48. The pin cylinder 49 is moved vertically on the shaft 51 by an arm 53 carried by a vertically movable rack bar 54 slidable vertically on the panel 22, as shown more completely in Fig. 1. This rack is driven by a pinion 55 attached to the shaft of a positioning motor 56 which is adapted to position the pin cylinder 49 so as to present the proper horizontal row of pins opposite the lever tip 48.

The lever 47 is normally positioned against an adjustable stop 57 and held in this position by an electromagnet 58. The movement of the lever 47 between the stop 57 and one of the pins 50, constitutes a measurement of the width of the particular letter or character represented by the pin, and movement of the lever from the pin to the stop rotates the worm 27 the proper distance to position the table 28 accurately under the camera.

The actuation of the lever 47 is effected by the motor 37 and its associated clutch disc 40 upon energizing a magnetic clutch 59 mounted adjacent and associated with the disc 40. The clutch 59 carries an arm 60 which is rotatable clockwise with the clutch to engage the lever 47 and move it so that the tip 48 engages the selected pin 50 on the pin cylinder 49. This movement actuates a push button 61 of a switch 62 to close the switch. A second switch 63 is mounted on the arm 60 and normally held in closed position by the action of a stop 64 and a spring 65 which pulls the arm 60 in a counterclockwise direction.

The stop 57 shown in Fig. 3 may be adjusted by a motor 66 which is a positioning motor normally connected to a width or style of type control signal means, not shown. Stop 57 may of course be adjusted by a hand knob 66a according to the style and width of type desired. In a similar manner different pin cylinders 49 may be used for different styles of type or for type fonts of greatly different relative widths.

The switch 63 on the arm 60 controls the electromagnet 58 and is therefore normally closed. When the arm 60 starts to move and the switch 63 opens, the magnet 58 is de-energized so that the arm 47 is readily movable to engage the proper pin 50, the clutch 46 also being de-energized. When the clutch 59 is de-energized and the switch 63 closed, magnet 58 pulls the arm 47 back to rotate worm 27. It will be understood that the pitch of the thread of the worm 27 is correlated with the stroke of the arm 47 so that the table 28 is moved the proper distance corresponding to the width of the character impressed upon the sensitized sheet. The operation is more completely described in connection with Fig. 5.

The different pins 50 on the cylinder 49 advantageously represent the different letters in the alphabet, numerals, punctuations and other characters. These pins may all be of different lengths and one pin may serve to measure two or more characters if the width of such characters are the same. The pins 50 are not the exact length of the particular characters which they measure, but project so that the difference in width of any two pins represents the difference between the width of the particular characters. It will be evident from the nature of the measuring operation effected by the lever 47 and the worm 27 that the shorter the pin the greater the movement of these elements.

*The spacing mechanism*

In the photographic production of text matter, it is necessary that the spaces between words or separate characters be equal in any given line. The apparatus therefore includes means for actuating the worm 27 in response to a space signal by contacts 2, 3 and 4 on the tape 10. This mechanism is associated with the right end of the worm 27 and comprises a clutch disc 67 fixed to the worm shaft, a magnetic clutch 68, like the clutch 46, having a downwardly extending arm 69 attached thereto. The clutch 68 is so arranged with respect to the extending shaft of the worm 27 and the clutch disc 67 that when it is rotated after being energized, it also rotates the clutch disc 67 and the worm 27 to move the table 28 to the right a step.

The arm 69 is moved by an arm 70 attached to a magnetic clutch 71 mounted for rotation on the shaft 38 in proximity to the clutch disc 39. When the clutch 71 is energized, it is rotated in the direction of the arrow on the clutch disc 39.

Figure 5:
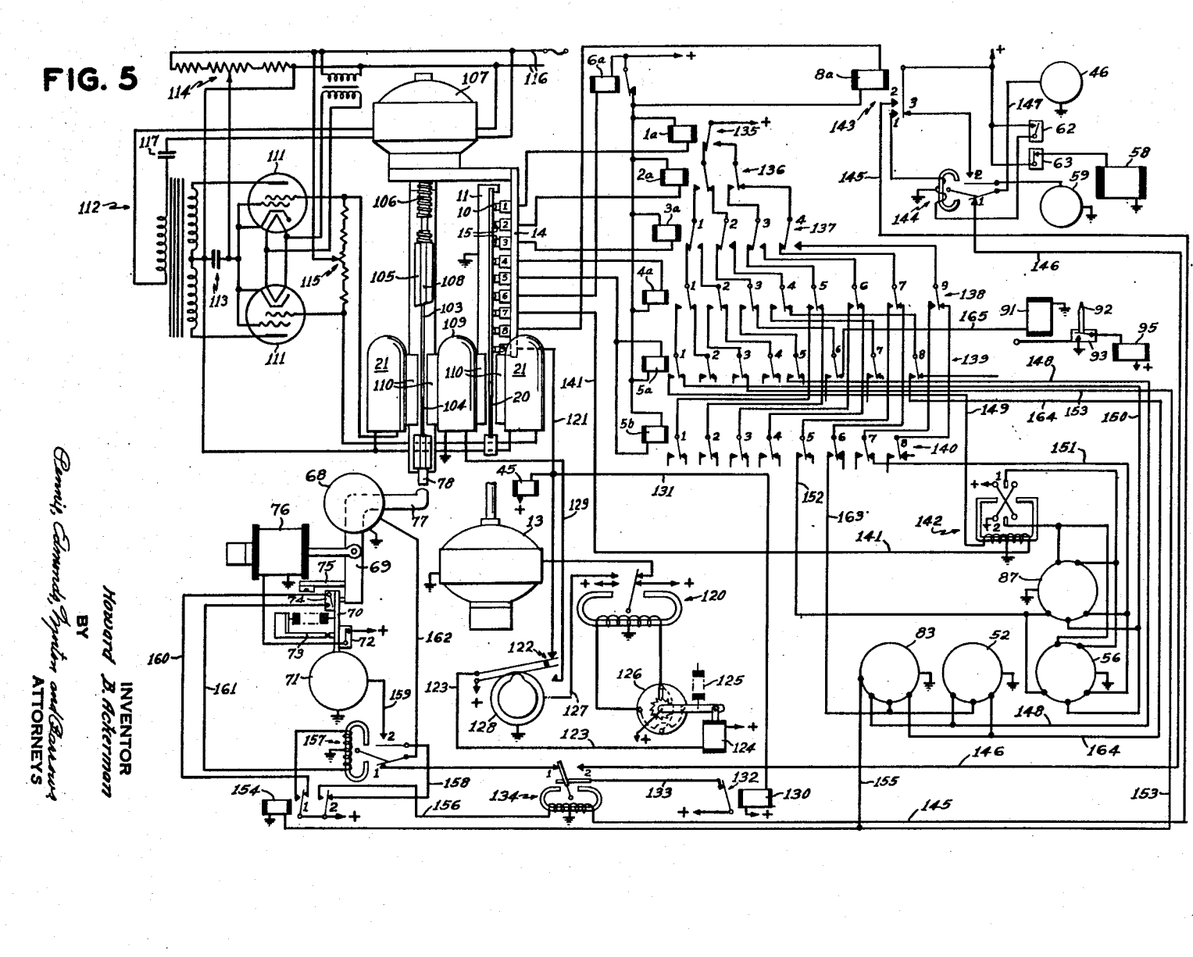
Fig. 5 is a circuit diagram showing in a schematic way one preferred form of circuit with certain of the related mechanisms, constructed and arranged in accordance with the features of my invention.

While the arms 69 and 70 are both shown in Fig. 1 of the drawings their relationship and mode of operation is more completely shown in the lower left hand corner of Fig. 5 of the drawings in which the arms and other associated elements are seen as if looking from the left in Fig. 1.

The arm 70 carries a push button switch 72 normally held in closed position against a stop 73 by a spring as shown. The arm 70 also carries a push button switch 74 the button of which engages the lower end of the arm 69 so that when the arm 70 acts on the arm 69, the switch 74 is closed. The arm 69 is normally held in fixed position against a stop 75 by an electromagnet 76 controlled by the switch 72 so that when the arm 70 starts to move forward in Fig. 1, or to the right in Fig. 5, the switch 72 is opened, the electromagnet 76 de-energized, and the arm 69 permitted to move counterclockwise. This movement, however, is restricted to a predetermined amount by an arm 77 attached to the arm 69 or to the clutch 68 which engages an adjustable stop 78, the position of which is controlled by the justification bar 20 on the record strip, in a manner described hereinafter.

After the arm 77 engages the stop 78, the clutch 68 will be energized so as to lock it to the clutch disc 67 and therefore rotate the worm 27 as the arm returns to the stop 75, and move the table 28 to the right the width of the justified space.

*The photographic mechanism*

Figure 2:
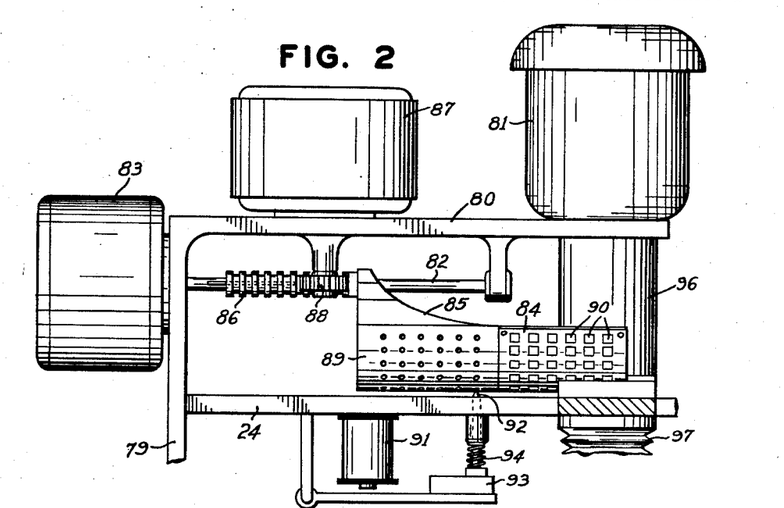
Fig. 2 is a broken elevational end view showing the upper portion of the apparatus of Fig. 1, looking from the left.

The mechanism for positioning the characters and photographing them is shown in Figs. 1 and 2. In Fig. 1 an upwardly extending panel or arm member 79 spaced back of the cross-bar or plate 24 carries a horizontally extending panel 80, Fig. 2, on which is mounted a light chamber 81 for containing the light to be used in projecting typographical elements. Directly beneath the panel or table section 80 is mounted an axially rotatable shaft 82 of a motor 83. An arc-shaped master character plate 84 is carried on a frame 85 attached to a rack sleeve 86 slidably mounted on the shaft 82. The rack sleeve 86 is driven by a motor 87 and a pinion 88. The frame 85 also carries a master perforated positioning plate 89 directly to the left of the master character plate 84.

The plate 84 is provided with a plurality of rows, in opposite directions, of square openings through the plate in which inserts 90 of transparent material are mounted, each insert being blackened except for the character representation formed therein. As an example, the upper right hand character insert 90 shown in Fig. 2 may be the small letter "a" and all of the windows thereunder around the plate may be small letters. The next row may be the corresponding capital letters, the third row figures and other typographical elements such as punctuations, etc. The plate advantageously carries another set of three rows of character inserts in italics. For example the fourth row on the plate may be small italic letters, the fifth row capital italic letters, and the last or the left row on the plate 84 may be figures and other characters in italics.

The positioning plate 89 is a metal plate of a size corresponding approximately to the plate 84 and has a set of positioning holes which correspond exactly to the respective character images or inserts 90 of the master character plate 84. When the motors 83 and 87 position the frame 85 in accordance with a signal from the record strip, an electromagnet 91 is then energized to press a cone-pointed pin 92 into the appropriate hole in the plate 89 and thereby make a final adjustment in the positioning of the master character plate 84. The mechanism associated with the magnet 91 and pin 92 includes a switch 93 mounted on the lever actuated by the magnet 91. This switch is normally open, and after the end of the pin 92 positions the plate 89, further application of force by the magnet 91 compresses a spring 94 to close the switch 93 which energizes a camera shutter magnet 94 arranged to operate the camera shutter to impress the selected character upon the sensitized plate. See Figs. 1 and 5.

The frame 85 and the master plate 84 carried thereby operate under a light chamber 96 housing a condensing lens through which light passes from the housing 81 to project the light image of the selected typographical element through an expansion bellows enclosure 97 and a shutter and projecting lens housings 98 as shown in Fig. 1. It will be noted that the shutter and lens housing is directly over a portion of the carrier 31 on which the light sensitive plate is held.

The projecting lens and shutter housing 98 is carried by a plate 99 attached to the bottom of a pair of racks 100 extending into guide tubes 101 attached to the underside of the plate 24. The racks 100 are operated by pinions 100a mounted on a motor shaft driven by a motor 102 or a hand knob 102a. The movement of the projecting lens and shutter in the housing 98 up or down changes the size of the character representation obtained on the photographic paper, as is well understood in this art. Certain of the camera elements such as the lens system and shutter mechanism are not shown, since such structures are conventional even in an apparatus of this general type.

*Justification control mechanism*

The mechanism for positioning the stop 78 is shown diagrammatically above the mechanism for actuating the worm 27 when a space signal on the record strip actuates the apparatus. This showing is diagrammatic and not necessarily arranged exactly as it would be in Fig. 1 of the drawings.

In Fig. 5 the record strip 10 is shown in a position when the justification mark 20 is set for actuation of the controls which adjust the position of the stop 78 to measure the spaces for a justified line of text matter. The stop 78 is mounted for vertical movement on a slide member including a transparent sheet or bar 103 having a black bar or line 104 printed thereon, the bar 103 being fastened to an internally threaded sleeve 105 comprising a part of the slide, which operates on a threaded shaft 106 of a special type of drag-cup motor 107. The slide includes opposite beads or tongues 108 which slide in vertical slots in the frame, but may include other types of guide means.

An electric light is mounted in a housing 109 directly between the record strip 10 and the sheet 103, outside of each of which is mounted a gas-filled, light-sensitive tube 21 of known type, for example RCA No. 923. The light housing 109 and the tubes 21 are provided with hoods 110 for light passage so that light is sent from the light housing 109 through vertical slits, into corresponding slits in the hoods for the tubes 21. Since the light for both tubes 21 comes from the same electric lamp in the housing 109, a very accurate comparison will be attained between the justification length bar 20 and the comparison bar or line 104.

The tubes 21 are wired into an electronic circuit arrangement comprising a pair of Thyratron tubes 111, a transformer 112, a condenser 113 and adjustable resistances 114 and 115. These resistances are used to balance the tubes 21, which are respectively wired into the Thyratrons 111, as indicated. The tubes 21 are both wired into transformer 112, condenser 113 and one of a pair of current supply leads 116. Alternating current is supplied to the control unit through lines 116, from which current of phase one goes directly to the drag-cup motor 107. The motor however is controlled by current of phase two from transformer 112, one line of which includes a condenser 117 which throws the current to motor 107 out of phase 90 degrees, the current from transformer 112 is single phase but out 90 degrees.

As the record tape moves through the machine and the justification bar 20 moves in between the light slits of the light housing 109 and the tube 21 to the right, the amount of light passing through the slit above the bar is registered in the light sensitive tube 21 which operates on the lower Thyratron 111 to actuate the motor 107, to in turn move the black bar 104 to the same height as the bar 20, or until the same light passes over the bar 104 that is passing over the bar 20. When the light is equal and motor 107 stops, the adjustment is complete and the stop 78 is positioned so as to control the space width for the line of text matter which follows on the tape 10.

*The wiring diagram and method of operating the apparatus*

The wiring diagram shown in Fig. 5 has been arranged to show the wiring circuit arrangement and to illustrate the operation of the apparatus in as simple a manner as possible. Therefore, instead of showing a number of wires connected into a D. C. current supply, plus signs are used at various points in the wiring diagram to indicate the fact that D. C. current is supplied at that particular point. Numerous ground symbols are also shown throughout the diagram.

When the master switch, not shown, is turned on, D. C. current is supplied to the apparatus, and the motor 13 for operating the record strip 10 starts to feed the strip through the apparatus as shown in Fig. 1. In Fig. 5 the record strip 10 is fed forward from the face of the paper until the black bar 20 comes between the light chamber 109 and the right-hand light sensitive tube 21, and the justification signal 19 takes the signal connector 9 to close a circuit. The motor 13 is grounded and current therefor is supplied from the right side of a polarized relay 120 as soon as the master switch is turned on. The circuit closed by signal contact 9 sends current through a wire 121 to ground through plate 11, a switch 122 and a wire 123, through an electromagnet 124, which in conjunction with a spring 125 actuates a ratcheted circuit-changing switch 126. The switch 126 as shown, holds the polarized relay 120 to supply current to the motor 13, until electromagnet 124 is energized, when the switch 126 is changed to switch the polarized relay 120 so that current is supplied from the opposite side through a wire 127 to a motor 128 which drives a cam and opens the switch 122. The rotation of the cam by the motor 128 opens the switch 122 and closes the switch directly therebelow to supply current through a wire 129 to light a lamp in the housing 109.

It will be noted that the changing of the polarized relay 120 stops the motor 13 and that it remains stopped while the motor 128 completes a revolution and recloses the switch 122, thereby re-energizing magnet 124 and shifting switch 126 and relay 120 so that current is again supplied to the motor 13. This operation puts out the light in housing 109.

During the time that the light is on in the housing 109, the electronic mechanism described above adjusts the position of the black bar 104 so that it corresponds to the justification or space-measuring bar 20 on the record strip 10, thereby fixing the position of the stop 78. When the light goes out in the housing 109, the light-sensitive mechanism remains inactive and the motor 107 remains dead, so that the thread 106 holds the stop 78 in fixed position while a line of text matter is composed. It will be understood that in composing such a line, several spaces between words may be measured from the set position of the stop 78.

The motor 128 is timed so that one revolution permits the movement of the bar 104 through its maximum amplitude or distance. The electronic mechanism and the light sensitive tubes are adapted and arranged to equalize the light bands projected above the bars 20 and 104. Any difference in such light bands will cause the motor 107 to operate to make the light bands to the tubes 21 equal. During the light measuring operation the motor 13 is stopped and the record strip 10 is not moved.

In addition to the above, the justification signal 19 energizes electromagnet 45 to release brake lever 43, and de-energizes clutch 46, so that clock spring 41 spins the worm 27 to move the table 28 to the left in Fig. 1 so that the new line of composition may be started.

The electromagnet 45 is connected into the wire 121 and to a current supply as shown. Current is normally on the clutch 46 in order to hold the worm 27 from moving except when its operation is desired. However, the current supplied to the clutch 46 is cut off by energizing an electromagnet 130 connected to a current supply source and to the wire 121 by a connecting wire 131. When the electromagnet 130 is energized it opens a switch 132 in a current supply wire 133 which leads to a polarized relay 134 having connections to both worm-operating clutches 46 and 68.

When the polarized relay 120 is shifted back to the position shown in Fig. 5 after the stop 78 is set, the record strip again continues to move until the "A" signal reaches the signal contacts. At the right of the bar 14 carrying the signal contacts numbered 1 to 9 inclusive, lead wires provide connections to various switch-operating electromagnets as follows:

Signal contact 1 is wired into an electromagnet 1a which controls a relay 135 having one movable switch element and two contacts.

Signal contact 2 is wired into an electromagnet 2a which operates a relay 136 having two switches which connect into the contacts of relay 135. Each of the switches has two contacts.

Signal contact 3 is wired to an electromagnet 3a which controls a relay 137 having four switches numbered 1 to 4 and each of these has two contacts, the switches being respectively wired into the contacts of relay 136.

Signal contact 4 is wired to an electromagnet 4a which actuates a relay 138 having switches numbered 1 to 8 wired into the contacts of the relay 137.

Signal contact 5 is wired into electromagnets 5a and 5b which operate in parallel. Electromagnet 5a controls a relay 139 having switches numbered 1 to 8 which connect into the outlets of switches numbered 1 to 4 of relay 138. Electromagnet 5b controls a relay 140 having switches numbered 1 to 8 which are connected respectively into the contacts of switches numbered 5 to 8 of relay 138. The arrangement for signal contact 5 would be the same if one electromagnet were used and 16 switches were connected into the 16 contacts of the 8 switches of relay 138.

Signal contact 8 operates an electromagnet 8a.

Signal contact 6 is wired into an electromagnet 6a, and when energized by a cancellation signal on the record tape it energizes the magnet 6a to cut the current supply to the electromagnets 1a and 5b inclusive and 8a.

Signal contact 7 is connected by a wire 141 to one side of a polarized polarity changing relay 142. When the record tape carries a signal for the signal contact 7 the relay 142 changes the polarity of motors 56 and 87, 180 degrees, thereby shifting from italics to standard small type on the pin cylinder and character plate.

In Fig. 5, all of the switches and relays are shown in their normal positions with the movable switch elements biased in such positions by conventional means. For example, it will be noted that in relays 135 to 140, the movable switch elements are shown engaging one of the pair of terminals or contacts associated therewith and movable to the opposite contacts when the relays are energized. In relays 135 and 137, the switch elements of course are movable away from the electromagnets by suitable leverage means, not shown, when these relays are energized. No attempt is made to show the complete wiring for all signals which may be sent through the relays 135 to 140, but for purposes of illustration, the connections are shown for the signals of the letters "a," "n" and "d."

Since each character signal carried by the tape 10 includes a long perforation signal, the apparatus operated by this signal will first be described before describing the circuit and apparatus operated by the remainder of the signal of the character "a." The signal contact 8 as shown, energizes electromagnet 8a of a relay 143 having contacts 1, 2 and 3, to move the switch element of this relay so that current is supplied by the wiring shown to contacts 1 and 2. Current flowing through the contact 1 of relay 143 actuates a polarized relay 144 to open switch 1 and close switch 2 thereof. At the same time current is supplied through contact 2 of relay 143 through a wire 145 which actuates the polarized relay 134 to move the switch element from contact 1 to contact 2 thereof. This sets up a current supply source for the electromagnetic clutch 46.

After the tape 10 moves on and the circuit through the signal contact 8 is broken, the switch member of the relay 143 moves back to its normal position as shown in Fig. 5, to energize contact 3 and send current through switch 2 of relay 144 to energize magnetic clutch 59, causing clockwise movement of its arm 60. The movement of this arm opens switch 63, de-energizing electromagnet 58 and closing switch 62, shifting relay 144 so that its switch 2 is opened and switch 1 is closed. This operation moves arm 47 to engage the "a" pin 50, de-energizes clutch 59, and energizes clutch 46 by current supplied through relay 144, wires 146 and 147, relay 134, contact 2, current supply wire 133 and switch 132.

When clutch 59 is de-energized, the spring connected to its arm returns the arm to its normal position, thereby closing switch 63 which energizes electromagnet 58, which acts on the arm 47 of the clutch 46 to rotate the worm 27 to the desired extent for the character "a" which has been printed on the sensitized sheet carried by the table 28.

The signal for "a" includes signal contacts 4 and 5 which will be energized along with contact 8. Therefore, while the foregoing operations are going on for the signal contact 8, electromagnets 4a, 5a and 5b are energized, shifting the switches of relays 138, 139 and 140. Current is therefore supplied from the current supply lead to the switch of relay 135, through the closed connecting switches of relays 135, 136 and 137, through relay 138, switch 3, relay 139, switch 5, and through a wire 148 to positioning motors 52 and 83, which respectively rotate the pin cylinder 49 and the character plate 84 to present the "a" pin and "a" on the character plate to the proper position for measurement and photographing. These operations are of course completed and signal contacts 4 and 5 disconnected before signal contact 8 is disconnected to obtain the proper sequence of steps as described in connection with Figs. 1 to 4.

It will be understood that the motors 56 and 87 which control the rows of characters used, will be operated by the signals for ordinary small type, ordinary capital letter type, ordinary type figures, small italics type, capital italics type and italics type figures. Therefore as long as the row of small ordinary type characters are being used, the motors 56 and 87 will not be operated.

The horizontal rows of pins on the pin cylinder 49 from bottom to top advantageously correspond to the six rows of characters or character inserts on the plate 84 from right to left. The positioning motors 56 and 87 are therefore arranged so that when they are set in one position by the relay 142 they will position the first three rows and when they are shifted by the relay 142 by 180 degrees, they will position the pin cylinder and character plate for the next three rows.

It will be noted that the relay 142 is arranged to send current in either of two directions through the motors 56 and 87 by connecting contacts 1 and 2 alternately either to the current source or to ground as indicated, each of these contacts being wired into the motors 56 and 87 as shown. In one position, current flows through contact 1 to the motors 56 and 87, and back out through contact 2, to ground. When italics characters are coming up on the tape 10, the tape will carry an italics signal for contact signals 2, 4 and 5 which will send current from switch 1 of relay 139 and a wire 149, to shift the polarized polarity, reversing relay 142, so that the motors 56 and 87 will operate on the italics rows of the pin cylinder and character plate.

Fig. 5 shows the connections for the various rows of pins and characters selected by the positioning motors 56 and 87. Assuming that the relay 142 is positioned to operate on the first three rows of characters, that is, ordinary type, a small type signal 2 and 4 sends the current through the appropriate relays as shown, and a line 150 connecting the lower center terminals of motors 56 and 87 with switch 1 of relay 139. Now if a capital letter signal 1, 3 and 5 comes up on the tape, current is sent through the appropriate relays and a line 151 from switch 7 of relay 140 to the motors 56 and 87. The capital letter signal operates either on the ordinary type row or on the italics capital letter row, i. e., with the motors in either position.

When "figures" are to be printed, a "figure" signal 1, 4 and 5 appears in advance on the tape and current is sent through the appropriate relays including switch 5 of relay 140 and a wire 152 to the motors 56 and 87, so that the "figure" row on the pin cylinder and character plate are selected. It will be understood that the "small type" signal, the "capital" letter signal and the "figures" signal apply to both positions of the motors 56 and 87 as set by the relay 142.

Whenever the space signal 2, 3, and 4 appears on the tape 10, the corresponding signal contacts will be energized and current sent through the appropriate switches of relays 135 to 140 to supply current through the third switch of the relay 139 and a wire 153 to an electromagnet 154 controlling a pair of switch elements connected to a current source, as shown. A branch wire 155 leads from the wire 153 to the motor 83 to shift it to blank. Any one of the rows of characters on the character plate 84 may include a blank so that no character will be photographed.

When the electromagnet 154 is energized, the switches 1 and 2 are shifted to supply current from switch 2 through a wire 156 to the polarized relay 134 and shift it so that the clutch 46 will be de-energized to release the worm 27 and set up a circuit from the current supply through switch 1 of a polarized relay 157. At the same time current is supplied from switch 1 of relay 154 to the polarized relay 157 to close its switch 2 and set up a circuit for clutch 71.

After the tape 10 moves on and the space signal contacts are broken, the electromagnet 154 is de-energized and current is then supplied from this relay through a wire 158, switch 2 of relay 157 and wire 159, to energize clutch 71, which immediately starts to rotate its arm 70 clockwise to open switch 72 and de-energize electromagnet 76, move arms 69 and 77 counterclockwise, until arm 77 contacts stop 78. This movement closes switch 74 on arm 70 which takes current from the relay 154 through a wire 160 and supplies it through a wire 161 to shift the polarized relay 157 and close switch 1 thereof. This energizes clutch 68 by current from line 133, relay 134 sent through a wire 162, so that the worm 27 may be rotated. The next operation includes the opening of switch 74 and the closing of switch 72, as the arm 70 is moved back by the spring. The closing of switch 72 energizes electromagnet 76 which pulls the lever 69 back against the stop 75 so that the worm 27 is rotated to move the table 28 the width of the justified space.

The apparatus actuated in response to the "a" signal has been described above. When the "n" signal 1 and 5 comes up on the tape, its corresponding contacts are connected to the grounded plate 11, so that current is supplied through the appropriate switches of the relays 135 to 140 and sent from switch 6 of relay 140 through a wire 163 to the positioning motors 52 and 83 to set the pin cylinder and character plate for the letter "n." Since the "n" signal includes the long slot, the other parts of the apparatus will be actuated in the manner described above for the letter "a."

When the "d" signal, 3 and 5, comes up on the tape, the corresponding signal contacts are energized to send current through the appropriate switches of the relays 135 to 140 and to supply current from switch 8 of relay 139 through a wire 164 leading to the motors 52 and 83, so that the pin cylinder and character plate are actuated to present the pin and character image for the letter "d."

The camera shutter is actuated whenever any one of the signal magnets 1a to 5b are energized, since it will be noted that switch 6 of relay 139, Fig. 5, is normally connected by a wire 165 to electromagnet 91 to maintain it normally energized. When a combination of signal contacts 1 to 5 are actuated, electromagnet 91 is de-energized to free the character plate so that it may be rotated to the selected position. After the signal is off, electromagnet 91 is re-energized so that pin 92 positions the character plate and switch 93 is closed to actuate the shutter magnet 95 and photograph the selected character.

In the photographing of a line of text matter, it will be understood that the line will be started exactly at the margin of the column of text matter on the light sensitive sheet. Therefore the projecting portion, 98 of the camera, the character elements 90 and the carrier 31, or table 28, are so positioned with respect to each other that the outer edge of the first character in a line of text falls at the column margin line, which would be to the right, as seen in Fig. 1.

For convenience, each character is regarded as including the character proper and a small space on each border, as in the case of type. The character units 90 are therefore positioned in the plate 84, and the positioning holes in the plate 89 are arranged so that the edge of any character including its edge space is focused so that it falls at the margin of the column or at the edge of a previously photographed character. After the first character in a line of text is photographed or projected onto the sensitive sheet, the table 28 is shifted the exact width of that character so that the edge of the next character photographed onto the sheet comes up directly to the edge of the previously photographed character, and so on.

Figure 2A:
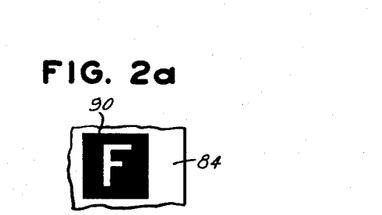
Fig. 2a is an enlarged view of the character insert for the letter "F."

The character units 90 as illustrated by "F" in Fig. 2a, includes a transparent outline of the character so that light projected by the camera mechanism shines through the character onto the light sensitive paper when the shutter is actuated. The character elements may be made in other known ways than that shown in Fig. 2a, and instead of making a positive photograph of the text matter carried by the record strip, a negative photograph may be made.

The size of letters photographed onto the sensitive sheet is preferably controlled so as to correspond to a standard size of type for most work, but the size may be changed in the manner described by adjusting the focus of the camera with the motor 102 or hand knob 102a, and the length of the stroke of the measuring arm 47 with the motor 66 or the hand knob 66a. For hand operation, the racks 100 may carry a scale as shown in Fig. 1 and a corresponding scale may be provided for the stop 57. Where it is desired to have the size of type controlled automatically by the record strip, this strip will carry a size of type bar and signal similar to that employed for the justified space, and light sensitive mechanism like that used for the space bar would be used for setting the size-of-type motors 66 and 102.

While the apparatus of the present invention has been described in connection with the use of a record tape or strip having slot-type perforations for various code signals, it will be understood that a tape with printed or other types of signals, may be employed. The printed signals carried by a transparent or light permeable strip may be conveniently used, or the signals may be printed or otherwise applied with current conducting materials. Bars such as bar 20 may likewise be made in various ways and measured by a different type of comparison mechanism than that illustrated. It may be a vertical or horizontal slot in the record strip and the record strip in such case may be opaque, where the slot is measured or compared by light sensitive means. The bar 20 and similar signals may be the exact length of the measured space or bear some known relationship thereto. The length of the bar 20 is measured from the bottom edge of the tape.

It will be understood that the record strip 10 will carry other signals besides the space and character signals illustrated. For example, it will carry a slug signal which will actuate the apparatus so as to move the table 28, but which will effect no photographing, as in the case of a space described above. A slug-width pin 50 may be carried on each horizontal row of the pin cylinder 49 or on any one of the two sets of three rows. Slug space is an em in width and the "M" pin 50 may be used to measure off the movement of the table 28.

The cancellation signal has been referred to in connection with the signal contact 6. In making the record tape this signal 6 is advantageously applied directly under the vertical row of perforations representing the character to be cancelled. Therefore, when the signal contacts engage such a signal and it includes a perforation for the signal contact 6, the electromagnet 6a in Fig. 5 will be energized to cut off the current supply, so that the photographing and character measuring apparatus will not be actuated. The slot for the signal 6 may be longer than the normal 1 to 5 slots, and extend slightly in front and in back of the character signal slots thereabove, so that the electromagnet 6a will be energized slightly before and remains energized slightly after the signal slots thereabove engage the corresponding signal contact springs.

Since, as stated above, the horizontal rows of pins 50 on the pin cylinder 49 from bottom to top correspond to the rows of characters on the character plate 84 from right to left in Fig. 2, it will be apparent that the motors 52 and 83 are positioning motors having as many positions as there are pins or characters in a row, which would at least be equal to the entire alphabet, although in Fig. 5 of the drawings only a few positions are indicated for purposes of illustration.

It will be noted from the foregoing description that the electrically-operated mechanism for rotating the worm 27 step-by-step in response to a character signal is very similar to that operated in response to a justified space signal. In photographing the characters of a word the clutch 46 remains normally energized between operations to aid in holding the worm 27 in position while other operations are going on as described above. When the relay 134 is shifted, however, to the position shown in Fig. 5, the clutch 68 will be normally holding the worm 27, that is, immediately after a justified space signal has actuated the apparatus to rotate the worm 27.

Suitable known means may be provided for holding a light sensitive photographic sheet on the carrier 31 so that it remains in fixed position during the operation of the apparatus. In fact, means may be provided for changing sheets when one is filled up and for restoring the carrier 31 to its position for starting a page of text matter. It will furthermore be understood from previously known practice that instead of providing a movable carrier 31, means may be provided for using a roll of light sensitive paper which is moved step-by-step from one roll to another as the lines of text are applied thereto.

From the foregoing description, it will be apparent that other modifications and changes may be made in various parts of the apparatus without departing from the spirit and scope of the invention, as defined by the appended claims.

I claim:

1. In an apparatus for photographically composing justified lines of text matter in response to character and space signals carried by a strip record of the text matter, including means for moving the record strip through the apparatus, a light projecting mechanism, and a carrier for a light sensitive sheet upon which projections of characters are impressed by the light projecting mechanism, the improvement which includes a record strip having character signals, space signals and justification signal means, the justification signal means having a component varying in magnitude in proportion to the justified space measurements for the individual lines of text matter which they represent, a master character plate positionable relative to the light projecting mechanism, electrically actuated mechanism controllable by and responsive to the character and space signals carried by the record strip, the electrically actuated mechanism including means actuated by a character signal for first positioning the character plate to present the character of the signal in position for photographing, for then impressing the character by light action upon the light sensitive sheet on the carrier, and for thereafter moving the carrier a distance equal to the width of the character for character spacing, said electrically actuated mechanism also including means actuated by a space signal for first positioning the character plate to present a blank at the photographing locus, and for then moving the carrier for word spacing to provide a space of a particular width as predetermined by a justification signal means.

2. Apparatus for photographically composing justified lines of text matter as defined by claim 1, wherein the character spacing means functions to move the carrier a distance equal to the width of the character for character spacing, wherein the separate and independent word spacing means functions to move the carrier to provide a justified space between words, and additionally including current supply means which is common to both the character and the word spacing means.

3. Apparatus for photographically composing justified lines of text matter as defined by claim 1, additionally including a rotatably mounted worm shaft having operative connection with the carrier for moving the carrier upon rotation of the shaft, wherein the character spacing means functions to rotate the shaft to move the carrier a distance equal to the width of the character for character spacing, wherein the separate and independent word spacing means functions to rotate the shaft to move the carrier to provide a justified space between words, and additionally including current supply means which is common to both the character and the word spacing means.

4. In an apparatus for composing justified lines of text matter in response to signals carried by a strip record of the text matter, including means for moving the record strip through the apparatus, the improvement which includes a record strip carrying justification signal means for controlling the space between words of said text matter, electrically actuated mechanism controllable by and responsive to the justification signal means carried by the strip, each justification signal means having a component varying in magnitude in proportion to the justified space measurements for the individual lines of text matter which they represent, an adjustable stop member providing space-width setting means, and said mechanism including means sensitive to variations in the component of the justification signal means for positioning the adjustable stop member whereby to set the space-width setting means for a particular space width as predetermined by the component of the justification signal means.

5. Apparatus for composing justified lines of text matter as defined by claim 4, additionally including an element adjustable with the stop member and which is adapted for comparison with the component of the justification signal, wherein the mechanism includes a light source located between the adjustable element and the component, and a motor for moving said element and stop member, and wherein the said means is responsive to differential amounts of light received from the light source as permitted by the element and the component for effecting operation of the motor to position the element in exact comparison with the component, whereby the stop member is accordingly adjusted for a particular space-width as determined by the component thus compared.

6. In an apparatus for composing justified lines of text matter in response to signals carried by a strip record of the text matter, including means for moving the record strip through the apparatus, the improvement which includes a record strip having space signals and having a justification signal for each line of text matter, the length of the justification signals being proportional to the respective space-widths which they represent, electrically actuated mechanism including word spacing means having actuation in response to a space signal, an adjustable stop member in associated relation with the word spacing means, said adjustable stop being operable to control the extent of actuation of said word spacing means, whereby the spacing between words may be varied depending on the adjustment of the stop member, and means controllable by and responsive to a justification signal for adjusting said stop member to accord with the length of the signal so that the position of the stop member will be representative of the justified word spacing for that line of text matter corresponding to the justification signal.

7. In an apparatus for composing justified lines of text matter in response to signals carried by a strip record of the text matter, including means for moving the record strip through the apparatus, and a carrier for a sheet onto which the text matter selected by the record strip is impressed, the improvement which includes a record strip having space signals and having a justification signal for each line of text matter, the length of the justification signals being proportional to the respective space-widths which they represent, electrically actuated mechanism including word spacing means for moving the carrier for spacing between words of said text matter, said word spacing means having actuation in response to a space signal and operating to move the carrier a distance proportional to the extent of actuation of said means, an adjustable stop member in associated relation with the word spacing means, said adjustable stop being operable to control the extent of actuation of the word spacing means, whereby the spacing between words of the text matter may be varied depending on the adjustment of the stop member, and electric means controlled by a justification signal and responsive to the length of the same for adjusting the stop member to accord with said length so that the position of the stop member will be representative of the justified word spacing for that line of text matter corresponding to the justification signal.

8. In an apparatus for photographically composing justified lines of text matter, the combination with means for projecting successive characters onto a light sensitive surface and a movable carrier for supporting said light sensitive surface, of means for moving the carrier including character spacing means operable to move the carrier a distance proportional to the extent of actuation of said means, said character spacing means including an element adapted to have oscillating movement, the movement of said element in an initial direction constituting a gauging stroke and in a return direction constituting an operating stroke, a positionable character pin gauge member, said pin gauge member providing a plurality of pins and which are selectively positioned thereby, said pins providing respective stops for the oscillating element and which accordingly operate to control the extent of the gauging stroke of said element, electric means operative at the end of each gauging stroke for coupling the oscillation element to the carrier whereby the carrier is moved upon each return operating stroke of the element, and electrically actuated mechanism for effecting operation of the pin gauge member and the spacing means in sequence, so that the pin gauge member is first actuated to position a pin corresponding to a character and then the spacing means is actuated to move the carrier for the width of the character as determined by the pin so positioned.

9. In an apparatus for photographically composing justified lines of text matter, the combination with a movable carrier for supporting a light sensitive surface, of means for moving the carrier including word spacing means operable to move the carrier a distance proportional to the extent of actuation of said means, said word spacing means including an element adapted to have oscillating movement, the movement of said element in an initial direction constituting a gauging stroke and in a return direction constituting an operating stroke, an adjustable stop member in associated relation with the word spacing means to provide a stop for the oscillating element and which is thus operable to control the extent of the gauging stroke of said element, whereby the spacing between words of the text matter may be varied depending on the adjustment of the stop member, means for adjusting the stop member for each line of text matter so that its position is precisely representative of the justified word spacing for the respective lines, and electric means operative at the end of each gauging stroke for coupling the oscillating element to the carrier whereby the carrier is moved upon each return operating stroke of the element.

10. In an apparatus for photographically composing justified lines of text matter in response to character signals carried by a strip record of the text matter, including means for moving the record strip through the apparatus, a light projecting mechanism, and a carrier for a light sensitive sheet upon which projections of characters are impressed by the light projecting mechanism, the improvement which includes a master character plate positionable relative to the light projecting mechanism, electrically actuated mechanism controllable by and responsive to a character signal carried by the record strip, said mechanism including a plurality of signal-actuated relays arranged in parallel rows and adapted to be connectable in a selective manner to form various series circuits for the passage of current, each relay except the relay of the first row having a pair of switches wired into one switch of a relay of the preceding row, said mechanism when actuated positioning the character plate to present the character of the signal in position for photographing, character measuring means, said electrically actuated mechanism when actuated also positioning the character measuring means simultaneously with the positioning of the character plate, photographic means thereafter responsive for then impressing the character by light action upon the light sensitive sheet on the carrier, and other means forming part of said mechanism for thereafter moving the carrier a distance equal to the width of the impressed character as determined by the character measuring means.

11. Apparatus for photographically composing justified lines of text matter as defined by claim 10, wherein the character plate and the character measuring means are both mounted for rotation and for longitudinal movement, wherein the mechanism for positioning the character plate and for positioning the character measuring means additionally includes electrical positioning motors, a pair of said motors being connected in parallel for respectively rotating the plate and the measuring means, and another pair of said motors being connected in parallel for respectively moving the plate and the measuring means longitudinally.

HOWARD B. ACKERMAN.

References Cited in the file of this patent

UNITED STATES PATENTS

| Number | Name | Date |
|---|---|---|
| 1,603,953 | Hunter | Oct. 19, 1926 |
| 1,732,049 | Hunter | Oct. 15, 1929 |
| 2,066,934 | Gullikson | June 5, 1937 |
| 2,178,379 | Spievak | Oct. 31, 1939 |
| 2,298,666 | Whitelaw | Oct. 13, 1942 |
| 2,320,337 | Bryce | June 1, 1943 |
| 2,378,371 | Tholstrup | June 12, 1945 |
| 2,379,862 | Bush | July 10, 1945 |

FOREIGN PATENTS

| Number | Country | Date |
|---|---|---|
| 65,015 | Sweden | Dec. 10, 1921 |